United States Patent
Li

(10) Patent No.: US 8,966,633 B2
(45) Date of Patent: Feb. 24, 2015

(54) METHOD AND DEVICE FOR MULTIPLE ENGINE VIRUS KILLING

(75) Inventor: Rongjun Li, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 14/112,195

(22) PCT Filed: Aug. 30, 2012

(86) PCT No.: PCT/CN2012/080794
§ 371 (c)(1),
(2), (4) Date: Oct. 16, 2013

(87) PCT Pub. No.: WO2013/044716
PCT Pub. Date: Apr. 4, 2013

(65) Prior Publication Data
US 2014/0304818 A1    Oct. 9, 2014

(30) Foreign Application Priority Data
Sep. 30, 2011 (CN) .......................... 2011-1-0292865

(51) Int. Cl.
G06F 21/00       (2013.01)
G06F 21/56       (2013.01)

(52) U.S. Cl.
CPC ............ G06F 21/568 (2013.01); G06F 21/562 (2013.01)
USPC .................. 726/24; 726/22; 726/26; 713/188

(58) Field of Classification Search
USPC ........................................................ 726/24
See application file for complete search history.

(56) References Cited

U.S. PATENT DOCUMENTS

| 7,103,913 | B2 * | 9/2006 | Arnold et al. | 726/22 |
| 7,540,030 | B1 * | 5/2009 | Zaitsev | 726/24 |
| 8,713,686 | B2 * | 4/2014 | Kane | 726/26 |
| 2005/0021994 | A1 * | 1/2005 | Barton et al. | 713/200 |
| 2008/0060075 | A1 * | 3/2008 | Cox et al. | 726/24 |
| 2009/0044024 | A1 * | 2/2009 | Oberheide et al. | 713/188 |
| 2013/0019306 | A1 * | 1/2013 | Lagar-Cavilla et al. | 726/22 |
| 2013/0247167 | A1 * | 9/2013 | Paul et al. | 726/11 |

FOREIGN PATENT DOCUMENTS

| CN | 101685486 | 3/2010 |
| CN | 101685486 A | 3/2010 |
| CN | 102081714 | 6/2011 |

OTHER PUBLICATIONS

International Search Report for PCT/CN2012/080794.

* cited by examiner

*Primary Examiner* — Morshed Mehedi
(74) *Attorney, Agent, or Firm* — Lowe Hauptman & Ham, LLP

(57) ABSTRACT

The present invention discloses a method and device for detecting and killing computer viruses using multiple antivirus engines. The method includes: receiving a request for scanning a file to be scanned; sending the information of the file to multiple antivirus engines for scanning, receiving the scanning information returned by the antivirus engines; determining the scanning result of the file, and sending the scanning result of the file, thereby supporting virus killing by using multiple antivirus engines. The present invention integrates the scanning result of multiple antivirus engines according to specific strategies, and utilizes characteristics of different antivirus engines to completely detect and kill various computer viruses based on the scanning result, thereby improving accuracy of virus killing and security of the system.

12 Claims, 4 Drawing Sheets

METHOD AND DEVICE FOR MULTIPLE ENGINE VIRUS KILLING

CROSS REFERENCE TO RELATED APPLICATION

This application is claims the benefit and priority of International Application No. PCT/CN2012/080794, filed on Aug. 30, 2012, which claims priority to Chinese Application No. 2011102928656, filed Sep. 30, 2011. The entire disclosures of each of the above applications are incorporated herein by reference.

BACKGROUND OF THE INVENTION

1. Field of the Invention

The invention relates to an information field, and more particularly, to a method for detecting and killing computer viruses by using multiple antivirus engines and related device.

2. Description of the Prior Art

As the progress of this information society, computers and networks become more and more important. Computer viruses cause damages and cost of computer resources. Computer viruses not only cause a huge cost of resources and money, but possibly introduce a disaster of the entire society.

The computer virus is computer instructions or program code, which is able to reproduce itself and is inserted into the computer execution procedure for ruining the functions of the computer, damaging data, or disrupting the computer. The computer virus is often parasitic, infectious, non-obvious, damaging, and various, and can be classified into worms, trojans, and script viruses.

In order to detect and kill computer viruses efficiently, many computer security providers develop antivirus software. The core of the antivirus software is an antivirus engine. The development of the antivirus engine is a professional technology having high technology entering gap, long development period, and high maintaining cost.

In the related art, the antivirus engine is the core of the entire antivirus software and antivirus applications. Please refer to FIG. 1 showing a block diagram of a conventional antivirus engine. The antivirus engine 110 comprises a file analyzing module 111, a virus scanning module 112, and a signature storage module 113. The corresponding processing procedure comprises:

The antivirus engine 110 receives an input from the application module 120 (the access route to the file).

And then, the file analyzing module 111 detects the type of the file and performs some pre-processing procedure on the file. For example, upon receiving a compressed file, the file analyzing module 111 firstly decompresses the compressed file. Upon receiving an encoded file, the file analyzing module 111 firstly decodes the encoded file.

After the analysis of the file, the file analyzing module 111 sends the information associated with the file to the virus scanning module 112. The virus scanning module 112 loads the signature storage module 113 to utilize the virus signatures for scanning the analyzed file in order to determine whether the analyzed file matches the virus signatures inside the virus signature database.

At last, the scanned information of the file returns to the application module 120.

Currently, the most common virus detection is achieved through a signature-based detection, checksum detection, manner detection, and software simulation detection.

As the progress of the antivirus technique, the cloud killing virus technique is introduced. At first, the cloud computing is a development of parallel computing, distributing computing, and network computing. It's a result of combining virtualizing, IaaS (Infrastructure as a Service), and PaaS (Platform as a Service) concepts. In general, the cloud computing is achieved by the cloud computing service provider. The cloud computing service provider establishes a cloud storage and computing center. Users link to the "cloud" through the network to utilize the "cloud" as a data storage and an application service center. The cloud killing is an application in the antivirus field of the cloud computing technique. In the cloud killing virus technique, a client end is not required to retain the virus signature database. The virus signature information is stored in the cloud. In the scanning procedure, the users obtain the characteristics of the file and send the characteristics of the file to the cloud. The cloud performs the matching procedure on the characteristics of the file and the virus signature database. At last, the matching result is sent back to the client end.

Applicants found the related art has following problems:

Computer viruses have more frequently been designed for profit. And the virus changes fast and its technology becomes higher and higher. Therefore, a single antivirus engine cannot detect all of the viruses. This is the reason why the current security software often adopts a multiple antivirus engine solution.

However, in a current design of multiple antivirus engines, how to support multiple antivirus engine killing, achieve a smart antivirus engine allocating strategy, and provide enough supports in different applications has not been solved in the related art.

SUMMARY OF THE INVENTION

It is therefore one of the primary objectives of the claimed invention to provide a method and related device to solve the above-mentioned problem of efficiently utilizing a plurality of antivirus engines to detect and kill computer viruses.

According to an exemplary embodiment of the claimed invention, a method for detecting and killing computer viruses applied in a system using a plurality of antivirus engines is disclosed. The method comprises: receiving a request for scanning a file to be scanned; respectively sending information of the file to the antivirus engines to make the antivirus engines to respectively scan the file; respectively receiving scanning information returned by the antivirus engines; and integrating the scanning information returned by the antivirus engines to determine a scanning result of the file and sending the scanning result of the file.

According to an exemplary embodiment of the claimed invention, a virus killing device applied in a system having a plurality of antivirus engines is disclosed. The virus killing device is connected to the antivirus engines, and the virus killing device comprises: a communication module, for receiving a request for scanning a file to be scanned, and sending a scanning result of the file; a managing module, for respectively sending information of the file to the antivirus engines to make the antivirus engines respectively scan the file, and respectively receiving scanning information returned by the antivirus engines; and a processing module, for integrating the scanning information received by the managing module to determine a scanning result of the file, and sending the scanning result of the file via the communication module.

Furthermore, the present invention discloses a computer readable medium. The computer readable medium stores an instruction set, upon the condition that the instruction set is being executed, the computer executes a method of detecting and killing computer viruses by using multiple antivirus engines of any one of the embodiments.

In addition, the present invention discloses a multi-antivirus engine virus killing system. The multi-antivirus engine virus killing system comprises: at least one application unit, a virus killing device of any one of the embodiments, and a plurality of antivirus engines.

In contrast to the related art, the present invention has following advantages.

Through the embodiments of the present invention, the present invention can send the file to a plurality of antivirus engines to scan, and integrate the scanning information returned by the antivirus engines, determine the scanning result of the file, and give a feedback. Therefore, the present invention virus killing procedure can support multi-antivirus engine killing, integrate the scanning information of the antivirus engines according to actual strategies, efficiently utilize advantages of different antivirus engines, support all kinds of virus-killing requirements, and raise the accuracy of virus killing and system security.

DETAILED DESCRIPTION OF THE PREFERRED EMBODIMENT

In the related art, killing virus is often accomplished by a single virus-killing antivirus engine. Even if multiple antivirus engines are utilized, the allocating and managing strategies are not well-developed. Furthermore, the related art cannot efficiently utilize the advantage of each antivirus engine or utilize the multi-antivirus engine to realize better a security strategy and a more efficient virus killing.

In order to overcome such defects, the present invention provides a method of detecting and killing computer viruses by using multiple antivirus engines. The present invention efficiently utilizes different advantages of a plurality of antivirus engines to raise the accuracy of killing virus and the security of the system.

Figure 1:
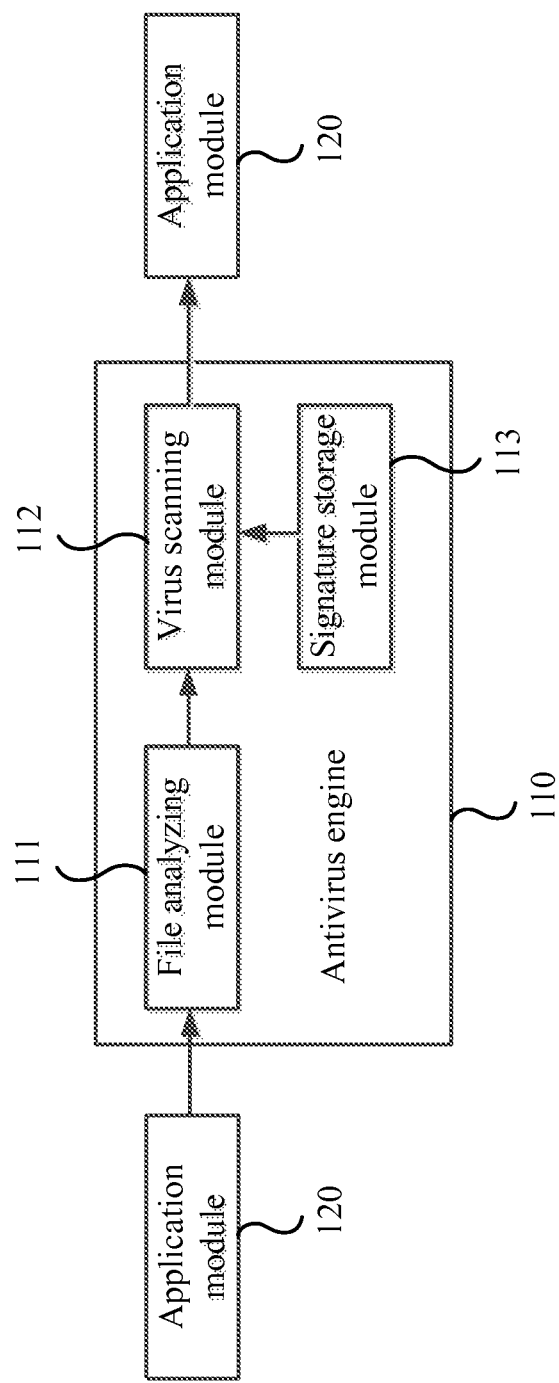
FIG. 1 is a block diagram of a conventional antivirus engine.
Figure 2:
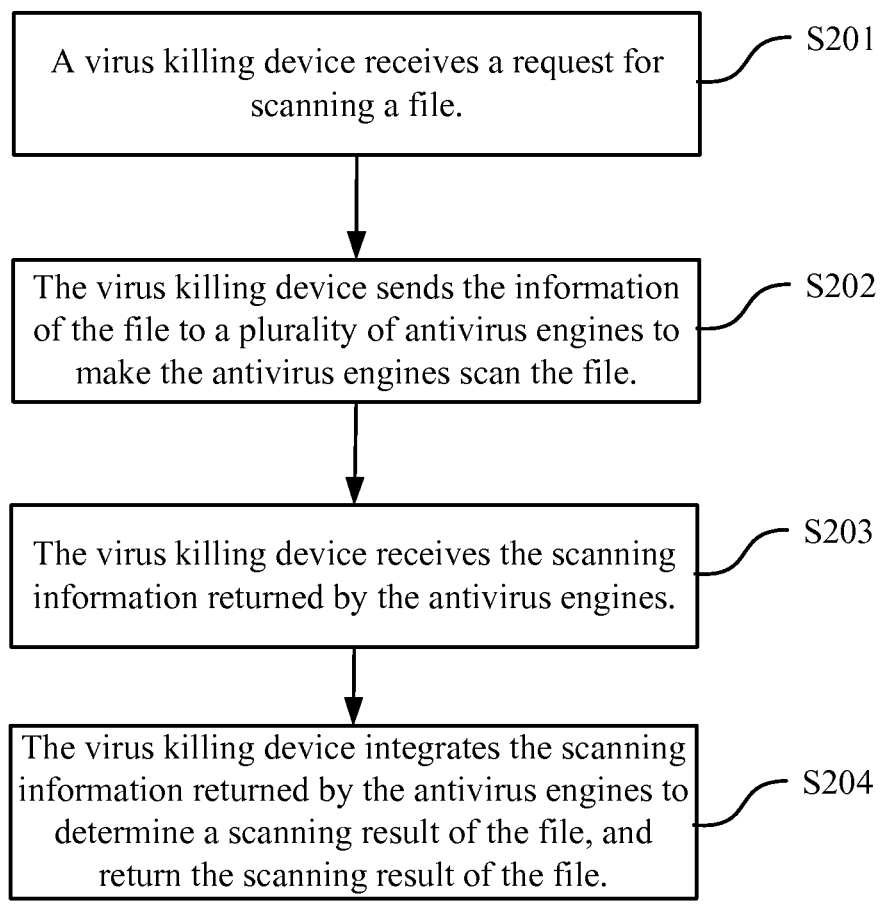
FIG. 2 is a flow chart showing a method of detecting and killing computer viruses by using multiple antivirus engines according to an embodiment of the present invention.

Please refer to FIG. 2, which is a flow chart showing a method of detecting and killing computer viruses by using multiple antivirus engines. The method of detecting and killing computer viruses by using multiple antivirus engines can be applied in a multi-antivirus engine system. The system comprises a virus killing device. The device is implemented by software/hardware, and it can be installed within an independent server, a computer of the client, or a certain server on the network. The virus killing device can be used to execute the present invention method of detecting and killing computer viruses by using multiple antivirus engines. The method of detecting and killing computer viruses by using multiple antivirus engines comprises following steps.

Step S201: The virus killing device receives a request for scanning a file. The scanning request is typically sent by the application unit. However, this is not a limitation of the present invention. For example, the request can be generated according to actively detections or periodically by the virus killing device.

Step S202: The virus killing device sends the information of the file to a plurality of antivirus engines to make the antivirus engines scan the file.

In the practical implementation, the step S202 comprises following procedures.

First of all, the virus killing device analyzes the request for scanning the file and determines the information of the file. For example, the information of the file can comprise the file type, file location, file generation time, and etc. The step of determining the information of the file indicates obtaining the information of the file. The information can be analyzed and obtained from the file or can be obtained from the request.

And then, the virus killing device adds the information of the file into a scanning queue according to the analyzing result. Furthermore, the virus killing device sends the information of the file to the antivirus engines according to an order of the scanning queue to make the antivirus engines scan the file.

In addition, the present invention comprises a step of performing a pre-processing procedure on the file before the virus killing device send the information of the file to the antivirus engines.

In the practical implementation, the pre-processing procedure comprises an identification of the file type. After identifying the file type, the present invention can comprise different processing procedure according to the file type. For example, for a compressed file, the present invention can decompress the compressed file first. In addition, for an encoded file, the present invention can decode the encoded file first.

Such pre-processing procedure accelerates file scanning and virus killing.

Step S203: The virus killing device receives the scanning information returned by the antivirus engines.

Step S204: The virus killing device integrates the scanning information returned by the antivirus engines to determine a scanning result of the file, and return the scanning result of the file. For example, upon the condition that the scanning request is sent by the application unit, the scanning result of the file will be sent to the application unit.

The purpose of this step is to efficiently utilize the advantages of each antivirus engine and to utilize the scanning information returned by the antivirus engines according to actual strategies. Therefore, the present invention can generate a more accurate scanning result of the file. That is, the virus-killing device can integrate the scanning information returned by the antivirus engines according to a predetermined or updated strategy to determine the scanning result of the file.

The actual procedure comprises the following two aspects:

(1) Strategy determination:

The actual strategy determination is achieved by the virus killing device. That is, the virus killing device determines a reference level of each antivirus engine regarding the file according to the information of the file, and/or the priority information of each antivirus engine, and/or local security level strategy.

The reference level determines the priority of the scanning information of each antivirus engine and how the scanning information of each antivirus engine influences the scanning result. The scanning information corresponding to a higher reference level means it has higher reference level and influences the final scanning result more.

In an embodiment, the present invention can determine an adopted strategy determination policy according to actual demands. Basically, the strategy determination policies can be divided into following several ones:

Policy 1: Determining the reference level of each antivirus engine regarding the file according to the information of the file.

The key point of this policy lies in the information of the file.

For example, the present invention can identify the information type of the file. Upon the condition that the information type of the file is a video file, then the reference level of an antivirus engine having a characteristic of better dealing with video virus killing is raised. Upon the condition that the information type of the file is an executable file, then the reference level of the scanning information returned by an antivirus engine having a characteristic of better dealing with executable file is raised. Similarly, for other types, such as a text file, figure files, the reference level of a corresponding antivirus engine could be raised. In a practical implementation, the above-mentioned reference level can be determined according to the type of the Trojans or viruses and the error rate and the killing rate of antivirus engines.

Furthermore, the present invention can identify the position information of the file. Upon the condition that the file lies in an important folder of the system disk, then the reference level of the scanning information returned by an antivirus engine having a characteristic of better dealing with system files is raised. Upon the condition that the file lies is a normal file stored in a normal disk, then the reference level of the scanning information returned by an antivirus engine having a characteristic of better dealing with regular files is raised.

In addition, the size, the generation time or other information of the file can also be a factor influencing the reference level of a specific antivirus engine. In the practical implementation, the designer can utilize one piece of the information or more information to determine the reference level of the antivirus engines. It depends on the actual needs. This change obeys the spirit of the present invention.

Policy 2: Determining the reference level regarding the file according to priority information of the antivirus engines.

This is mainly based on a consideration on the accuracy of the antivirus engines. For example, the reference level of an antivirus engine having more information in the virus signature database can be set higher. Or, the reference level of an antivirus engine having a latest virus signature database can be set higher. Or, the reference level of an antivirus engine having a higher killing rate or a lower error rate can be set higher.

In this policy, the scanning information of those antivirus engines having higher priorities is more important. It will be firstly adopted or highly referred when all the scanning information is integrated.

Policy 3: Determining the reference level of each antivirus engine regarding the file according to the local security level policy.

This policy raises the local optional ability on the antivirus engines. For example, for higher local security requirement, the reference level of the antivirus engine having a security level higher than local security level is raised. In this way, a virus killing can be performed on those having security problems. For lower local security requirement, the reference level of the antivirus engine having a security level higher than local security level is lowered. In this way, frequent security warnings can be avoided.

In the practical implementation, the above-mentioned policies can be utilized individually or combined. For example, upon the condition that the file type belongs to a system file, then the reference level of the antivirus engine having a security level higher than local security level is raised. The designer can determine which policy or multiple policies are applied. The actual policy and combination of policies are not limited as the above-mentioned disclosure. Those capable of achieving the same technique purpose obey the spirit of the present invention.

(2) Integration:

The virus killing device integrates the scanning information returned by the antivirus engines according to the reference levels and the scanning information returned by the antivirus engines in order to determine the scanning result of the file.

The integration is mainly to combine the scanning information with the reference level of the antivirus engine regarding the file, and firstly or mainly consider the scanning information returned by antivirus engines having higher reference level to generate the scanning result. In this way, the present invention efficiently utilizes the advantages of each antivirus engine to raise the virus-killing accuracy and the system security. For example, upon the condition that the scanning information returned by antivirus engines having lower reference level indicates that the file is safe and the scanning information returned by antivirus engines having higher reference level indicates that the file may be potentially dangerous, the system determines that the file may be potentially dangerous and performs the virus-killing procedure.

Please note, upon the condition that the above-mentioned system lies in a plurality of application units, the virus-killing device is connected to the application units via different communication channels, receives the request for scanning the file from the application units via corresponding communication channels, and sends the scanning result to the application units via the corresponding communication channels. That is, in steps S201 and S204, the virus-killing device communicates with the application units via different communication channels. In step S201 of receiving the request for scanning the file, the step S201 comprises: receiving the request for scanning the file from the application units via different communication channels. And in the step S204 of sending the scanning result of the file, the step S204 comprises: sending the scanning result of the file to the application units via different communication channels. In this way, it is guaranteed that the scanning result can be precisely sent back to the application unit which sends out the scanning request. Furthermore, this process separates the communications of the application units such that it avoids the cross-interference of the application units. Therefore, it raises the accuracy of the communication and signal feedback.

In contrast to the related art, the present invention has following advantages:

Through the embodiments of the present invention, the present invention can send the file to a plurality of antivirus engines to scan, and integrate the scanning information returned by the antivirus engines, determine the scanning result of the file, and give a feedback. Therefore, the present invention virus killing procedure can support multi-antivirus engine killing, integrate the scanning information of the antivirus engines according to actual strategies, efficiently utilize advantages of different antivirus engines, support all kinds of virus-killing requirements, and raise the accuracy of virus killing and system security.

In the following disclosure, applicants will illustrate the technique of the embodiment of the present invention upon the condition of the actual application environment.

In this embodiment, a plurality of antivirus engines (the above-mentioned antivirus engines) are implemented with client's software. The antivirus engines include a local antivirus engine and a cloud antivirus engine.

In this embodiment, the system comprises a plurality of application units, a virus-killing device, and a plurality of antivirus engines.

Furthermore, the above-mentioned virus-killing device is achieved by the IPC (inter-process communication) module, a file enumerating module, an antivirus engine managing module, and a result processing module.

Figure 3:
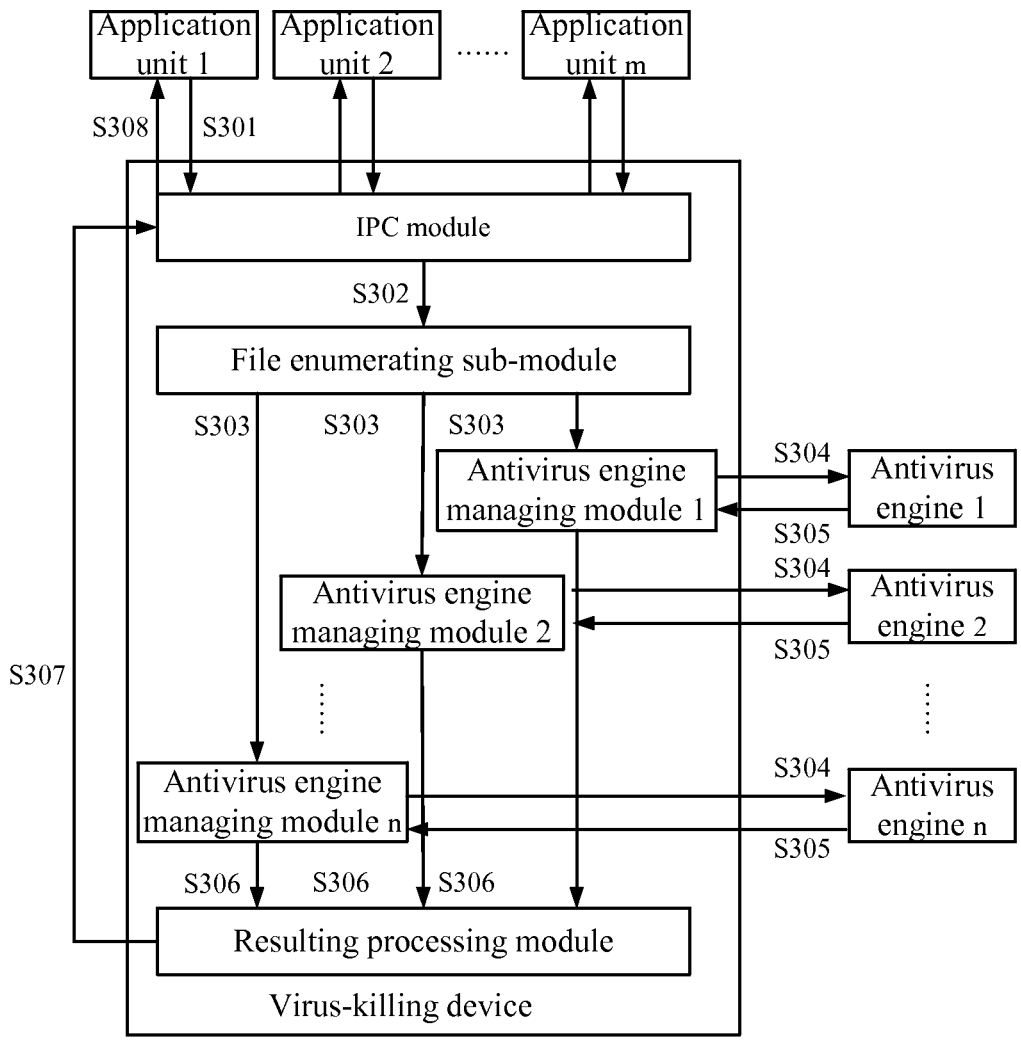
FIG. 3 is a diagram showing a multi-antivirus engine virus killing system according to an embodiment of the present invention.

The actual process procedure is shown in FIG. 3. The function of each of the modules will be illustrated as follows.

The IPC module is used for realizing the communications between the application units and the virus-killing device. The application units and the virus-killing device utilize the same communication protocol. The application units inform the virus-killing device about the file through sending the scanning request to the virus-killing device. The virus-killing device utilizes the antivirus engines to scan the file, and sends the scanning result back to the application units via the IPC module. In this way, the application units can perform following procedure. In addition, in order to support multiple applications, each of the application units establishes its own communication channel with the IPC module. Each of the application units and the IPC module communicates with each other via its own communication channel. Each of the application unit can communicate with the virus-killing device easily without affecting the communications between other application units and the virus-killing device.

The file enumerating module is used for analyzing the scanning request and enumerating files to form the scanning queue. Surely, in order to guarantee that the scanning can be performed smoothly, the file enumerating module further performs some pre-processing procedures. For example, the file enumerating module determines the file type and decompresses the compressed files. After the pre-process procedure, the file enumerating sends the information of the file and the route to each of the antivirus engines, wherein the route is a route for the antivirus engine managing module and the antivirus engines to obtain the file. For example, the route indicates the location of the application unit where the file is stored in. Please note, the route can be sent to each of the antivirus engine managing module as independent information or part of the information of the file.

The antivirus engine managing modules are used to connect to the antivirus engines and send the information of the file and the route to the antivirus engines such that the antivirus engines can scan the file. Furthermore, the antivirus engine managing modules receive the scanning information returned by the antivirus engines and send the scanning information to the result processing module.

In this embodiment, a plurality of antivirus engines are provided. The virus-killing device comprises a plurality of antivirus engine managing modules. Each of the antivirus engine managing modules is connected to only one corresponding antivirus engine and communicates with that antivirus engine. These antivirus engine managing modules do not affect each other. Therefore, upon the condition that one or more antivirus engines or antivirus engine managing modules are out of order, other antivirus engines and other antivirus engine managing modules can still work normally such that the virus-killing procedure can be performed normally. Surely, when number of the antivirus engines needs to be increased/decreased, the present invention can correspondingly increase/decrease corresponding antivirus engine managing modules without affecting other antivirus engines.

The result processing module integrates the scanning information sent by the antivirus engine managing modules to generate a corresponding scanning result, and sends the scanning result to the corresponding application units via the IPC module. Please note, the processing strategies of the result processing module has been illustrated in the above-mentioned step S204 and thus omitted here.

The present invention system comprises a plurality of antivirus engines. Each of the antivirus engines has similar port to receive the file and perform the scanning procedure. The antivirus engines obtain the information of the file form the virus-killing device. After completing the scanning procedure, the scanning information is sent back to the virus-killing device.

In this embodiment, the present invention comprises different antivirus engines, such as local antivirus engine and cloud antivirus engine. The local antivirus engine and the cloud antivirus engine have different characteristics and allocating strategies. Furthermore, different local antivirus engines may have different characteristics. In order to combine different antivirus engines, in this embodiment, corresponding antivirus engine managing modules are provided to corresponding antivirus engines. In each of the antivirus engine managing module, an allocation algorithm is realized.

Please refer to FIG. 3. In the following disclosure, a further illustration on an embodiment of the present invention will be disclosed.

Step S301: A plurality of application units respectively send scanning requests to the virus-killing device.

That is, each of the application units performs inter-process communications to request for scanning via the IPC module of the virus-killing device.

Step S302: the IPC module transfers the requests to the file enumerating module.

The file enumerating module analyzes the requests, determines the information of the file, and enumerating the file to generate a scanning queue.

Step S303: The file enumerating module send the information of the file and the route to each of the antivirus engine managing modules according to the scanning queue.

Step S304: Each of the antivirus engine managing modules sends corresponding information to its corresponding antivirus engine.

Each of the antivirus engines scans the file according to the corresponding information.

Each of the antivirus engines starts a scanning procedure and executes a scanning circulation logic. The antivirus engines obtain the file and all other information required for scanning from the antivirus engine managing modules. After the scanning procedure, the antivirus engines send the scanning information to the antivirus engine managing modules.

Step S305: Each of the antivirus engines transfers its scanning information to its corresponding antivirus engine managing module.

Step S306: Each of the antivirus engine managing modules sends received scanning information to the result processing module.

The result processing module integrates the scanning information returned from the antivirus engines and determines the scanning result of the file according to corresponding strategies.

Step S307: The result processing module sends the scanning result to the IPC module.

Step S308: The IPC module sends the scanning result to corresponding application units.

From the above disclosure, it can be seen that the present invention efficiently utilize the advantages of each antivirus engine. The present invention can has a fast virus-killing speed, a huge virus coverage, short response time, and good cleaning efficiency.

In contrast to the related art, the present invention has following advantages:

Through the embodiments of the present invention, the present invention can send the file to a plurality of antivirus engines to scan, and integrate the scanning information returned by the antivirus engines, determine the scanning result of the file, and give a feedback to the application units. Therefore, the present invention virus killing procedure can support multi-antivirus engine killing, integrate the scanning information of the antivirus engines according to actual strategies, efficiently utilize advantages of different antivirus engines, support all kinds of virus-killing requirements, and raise the accuracy of virus killing and system security.

Figure 4:
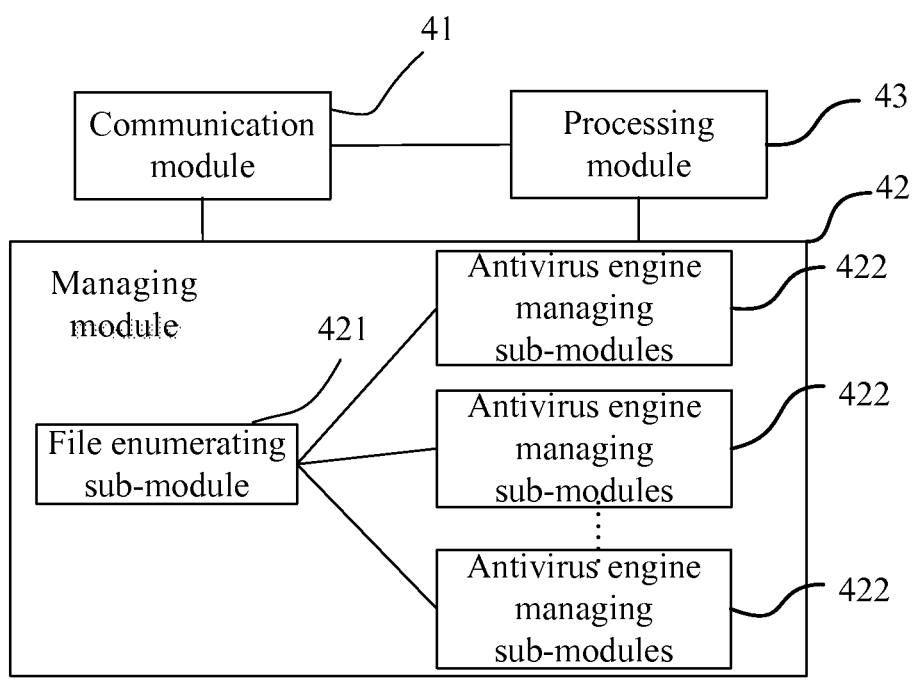
FIG. 4 is a diagram showing a multi-antivirus engine virus killing device according to an embodiment of the present invention.

In addition, the present invention further provides a virus-killing device applied in a system having a plurality of antivirus engines. The virus-killing device is connected to a plurality of antivirus engines respectively. The virus-killing device is shown in FIG. 4, and it comprises: a communication module 41, a managing module 42, and a processing module 43.

The communication module 41 is for receiving a request for scanning a file to be scanned, send the scanning result of the file. Upon the condition that the scanning request and the scanning result are related to the application units, the communication module 41 receives the request for scanning the file from the application units, and send the scanning result to the application units.

The managing module 42 is used to respectively send the information of the file corresponding to the received request to the antivirus engines to make the antivirus engines respectively scan the file. And then, the managing module 42 receives scanning information returned by the antivirus engines.

The processing module 43 is used to integrate the scanning information returned by the antivirus engines to determine the scanning result of the file, and send the scanning result of the file via the communication module 41.

Please note, upon the condition that the system has a plurality of application units, the communication module 41 is further connected to the application units via different communication channels, receives the request sent by the application units via different communication channels, and sends the scanning result to the application units via the different communication channels.

Moreover, in this embodiment, the managing module 42 comprises a file enumerating sub-module 421 and a plurality of antivirus engine managing sub-modules 422. The antivirus engine managing sub-modules 422 are respectively connected to the antivirus engines.

The file enumerating sub-module 421 is used to analyze the request received from the communication module 41, determine the information of the file, add the information of the file into a scanning queue, send the information of the file to the antivirus engine managing sub-modules 422 according to an order of the scanning queue.

The antivirus engine managing sub-modules 422 are used to transfer the information of the file sent by the file enumerating sub-module 421 to the corresponding antivirus engines to make the antivirus engines scan the file, and to receive the scanning information returned by the antivirus engines.

In the practical implementation, the file enumerating sub-module 421 can be further used to perform a pre-processing procedure on the file before sending the information of the file to the antivirus engine managing sub-modules 422.

In addition, the processing module 43 is used to determine a reference level of each antivirus engine regarding the file according to the information of the file, and/or the priority information of the antivirus engines, and/or the local security strategy. Furthermore, the processing module 43 is further used to integrate the scanning information returned by the antivirus engines according to the corresponding reference levels and the scanning information received by the managing modules 42 and returned by the antivirus engines to determine the scanning result of the file. Moreover, the processing module 43 is used to send the scanning result of the file to the communication module 41.

In contrast to the related art, the present invention has following advantages.

Through the embodiments of the present invention, the present invention can send the file to a plurality of antivirus engines to scan, and integrate the scanning information returned by the antivirus engines, determine the scanning result of the file, and give a feedback to the application units. Therefore, the present invention virus killing procedure can support multi-antivirus engine killing, integrate the scanning information of the antivirus engines according to actual strategies, efficiently utilize advantages of different antivirus engines, support all kinds of virus-killing requirements, and raise the accuracy of virus killing and system security.

The present invention further discloses a multi-antivirus engine virus killing device. The multi-antivirus engine virus killing device comprises a storage medium, for storing instruction; and a processing unit, coupled to the storage medium, for executing the instructions stored inside the storage medium and executing a method of detecting and killing computer viruses by using multiple antivirus engines disclosed in the above-mentioned embodiments. The multi-antivirus engine virus killing device can be a user's computer comprising the storage medium and the processing unit. A client end is set inside the user's computer, and it can be executed to perform the above-mentioned antivirus engine virus killing methods.

The present invention further discloses a multi-antivirus engine virus killing system. The multi-antivirus engine virus killing system comprises: at least one application unit, a virus killing device as disclosed in the above-mentioned embodiments, and a plurality of antivirus engines. The antivirus engines can be local antivirus engines or cloud antivirus engines on the network.

From the above, one having ordinary skills in the art can clearly understand that the present invention can be implemented with hardware or software plus a common hardware platform. Upon this understanding, the present invention can be implemented with a software product, which can be stored in a non-volatile storage medium (such as CD-ROM, flash drive, or movable hard disk). The software product may comprise several instructions such that a computer (such as personal computer, server, or network devices) can execute the instructions to perform the virus-killing procedure disclosed in the above embodiments.

Please note, the above-mentioned figures are only used for illustration, not a limitation of the present invention. The modules and flow shown in those figures are optional and not limitations of the present invention.

In addition, the above-mentioned modules are only utilized as embodiments, not limitations of the present invention. These modules can be separated or combined into one module. Furthermore, they can be distributed into one or multiple devices according to actual needs. These changes all obey the spirit of the present invention.

Moreover, the marking numbers of the devices are only for illustration, not for indicating the superior classes of the devices.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for detecting and killing computer viruses using a plurality of antivirus engines applied in a system comprising a plurality of application units, the method comprising:

receiving requests sent by each of the plurality of application units via different communication channels connected to each of the plurality of application units;

respectively sending information of the file to the antivirus engines to make the antivirus engines to respectively scan the file;

respectively receiving scanning information returned by the antivirus engines;

determining a reference level of each of the antivirus engines regarding the file according to the information of the file, priority information corresponding to the antivirus engines, and a local security level strategy;

integrating the scanning information returned by the antivirus engines according to the reference level of each antivirus engine and the scanning information to determine a scanning result of the file; and sending the scanning result to each of the plurality of application units via the different communication channels.

2. The method of claim 1, wherein the step of respectively sending the information of the file to the antivirus engines to make the antivirus engines to respectively scan the file comprises:

analyzing the request to obtain the information of the file; and adding the information of the file to a scanning queue according to the analyzing result, and respectively sending the information of the file to the antivirus engines according to an order of the scanning queue such that the antivirus engines respectively scan the file.

3. The method of claim 2 further comprising:

performing a pre-processing procedure on the file before sending the information of the file to the antivirus engines.

4. A virus killing device, applied in a system having a plurality of antivirus engines and a plurality of application units, the virus killing device connected to the antivirus engines, the virus killing device comprising:

a communication module connected to each of the plurality of application units via different communication channels, configured to receive requests sent by each of the plurality of application units via the different communication channels for scanning a file to be scanned, and sending a scanning result of the file to each of the plurality of application units via the different communication channels;

a managing module, configured to send information of the file to the antivirus engines to make the antivirus engines respectively scan the file, respectively receiving scanning information returned by the antivirus engines, configured to determine a reference level of each of the antivirus engines regarding the file according to the information of the file, a priority information of the antivirus engines, and a local security level strategy, configured to integrate the scanning information returned by the antivirus engines according to the reference level and the scanning information returned by the antivirus engines and received by the managing module in order to determine a scanning result of the file, and configured to send the scanning result of the file to the communication module; and a processing module, configured to integrate the scanning information received by the managing module to determine a scanning result of the file, and sending the scanning result of the file via the communication module.

5. The virus killing device of claim 4, wherein the managing module comprises:

a file enumerating sub-module configured to analyze the request for scanning the file received by the communication module, determining the information of the file, add the information of the file into a scanning queue, and send the information of the file to the antivirus engine managing sub-modules according to an order of the scanning queue; and a plurality of antivirus engine managing sub-modules, each coupled to one of the antivirus engines, configured to transfer the information of the file sent by the file enumerating sub-module to the corresponding antivirus engines to make the antivirus engines scan the file, and to receive the scanning information returned by the antivirus engines.

6. The virus killing device of claim 5, wherein the file enumerating sub-module is further configured to perform a pre-processing procedure on the file before sending the information of the file to the antivirus engine managing sub-modules.

7. A non-transitory computer readable medium storing an instruction set, upon the condition that the instruction set is being executed, the computer executes a method of detecting and killing computer viruses by using a plurality of antivirus engines applied in a system comprising a plurality of application units, the method comprising:

receiving requests sent by each of the plurality of application units via different communication channels connected to each of the plurality of application units;

respectively sending information of the file to the antivirus engines to make the antivirus engines to respectively scan the file;

respectively receiving scanning information returned by the antivirus engines;

determining a reference level of each of the antivirus engines regarding the file according to the information of the file, priority information corresponding to the antivirus engines and a local security level strategy;

integrating the scanning information returned by the antivirus engines according to the reference level of each antivirus engine and the scanning information to determine a scanning result of the file; and sending the scanning result to each of the plurality of application units via the different communication channels.

8. The non-transitory computer readable medium of claim 7, wherein the step of respectively sending the information of the file to the antivirus engines to make the antivirus engines to respectively scan the file comprises:

analyzing the request to obtain the information of the file; and adding the information of the file to a scanning queue according to the analyzing result, and respectively sending the information of the file to the antivirus engines according to an order of the scanning queue such that the antivirus engines respectively scan the file.

9. The non-transitory computer readable medium of claim 7 further comprising:
performing a pre-processing procedure on the file before sending the information of the file to the antivirus engines.

10. A multi-antivirus engine virus killing system comprising:
a plurality of application units, a virus killing device connected to the antivirus engines, and a plurality of antivirus engines, the virus killing device comprising:
a communication module connected to each of the plurality of application units via different communication channels, configured to receive requests sent by each of the plurality of application units via the different communication channels for scanning a file to be scanned, and sending a scanning result of the file to each of the plurality of application units via the different communication channels;
a managing module, configured to send information of the file to the antivirus engines to make the antivirus engines respectively scan the file, respectively receiving scanning information returned by the antivirus engines, configured to determine a reference level of each of the antivirus engines regarding the file according to the information of the file, a priority information of the antivirus engines, and a local security level strategy, configured to integrate the scanning information returned by the antivirus engines according to the reference level and the scanning information returned by the antivirus engines and received by the managing module in order to determine the scanning result of the file, and configured to send the scanning result of the file to the communication module; and
a processing module, configured to integrate the scanning information received by the managing module to determine a scanning result of the file, and sending the scanning result of the file via the communication module.

11. The virus killing system of claim 10, wherein the managing module comprises:
a file enumerating sub-module configured to analyze the request for scanning the file received by the communication module, determining the information of the file, add the information of the file into a scanning queue, and send the information of the file to the antivirus engine managing sub-modules according to an order of the scanning queue; and
a plurality of antivirus engine managing sub-modules, each coupled to one of the antivirus engines, configured to transfer the information of the file sent by the file enumerating sub-module to the corresponding antivirus engines to make the antivirus engines scan the file, and to receive the scanning information returned by the antivirus engines.

12. The virus killing system of claim 11, wherein the file enumerating sub-module is further configured to perform a pre-processing procedure on the file before sending the information of the file to the antivirus engine managing sub-modules.

* * * * *